United States Patent [19]

Sauerbruch

[11] Patent Number: 4,862,930
[45] Date of Patent: Sep. 5, 1989

[54] PROCESS FOR FEEDING AN INJECTION MOLDING MACHINE AND DEVICE FOR CARRYING OUT THE PROCESS

[76] Inventor: Ernst Sauerbruch, Gewerbestrasse 31, D-7702 Gottmadingen, Fed. Rep. of Germany

[21] Appl. No.: 104,399

[22] Filed: Oct. 5, 1987

[30] Foreign Application Priority Data

Oct. 4, 1986 [DE] Fed. Rep. of Germany ......... 363392

[51] Int. Cl.⁴ .............................................. B65B 1/04
[52] U.S. Cl. ........................................ 141/1; 141/249
[58] Field of Search .............................. 141/1, 5, 249

[56] References Cited

U.S. PATENT DOCUMENTS

| 3,088,499 | 5/1963 | Rieger | 141/249 X |
| 3,830,264 | 8/1974 | Billett et al. | 141/1 |
| 4,576,209 | 3/1986 | Eisenberg | 141/1 |

FOREIGN PATENT DOCUMENTS 1032558 6/1966 United Kingdom ........... 141/249 X

Primary Examiner—J. R. Scott
Attorney, Agent, or Firm—Edmund M. Jaskiewicz

[57] ABSTRACT

A process for feeding an injection molding machine including polyester processing with a plastic material to be processed comprising the steps of placing the plastic material to be processed into a container having two opposed open ends and closing these open ends with removable covers. There is provided a frame which is pivotable between intake and discharge positions around an axis supported between a pair of spaced parallel surfaces and there are means on the frame for carrying the containers. The closed container is placed on the carrying means in an intake position and the covers are retracted from the container ends. The swivel frame is pivoted to displace the open ended container of plastic material between the two parallel spaced surfaces from the intake position into a discharge position at the feed cylinder of the machine. The parallel surfaces are spaced the length of the container. The plastic material is then pushed from the container into the feed cylinder while the container is in the discharge position.

11 Claims, 2 Drawing Sheets

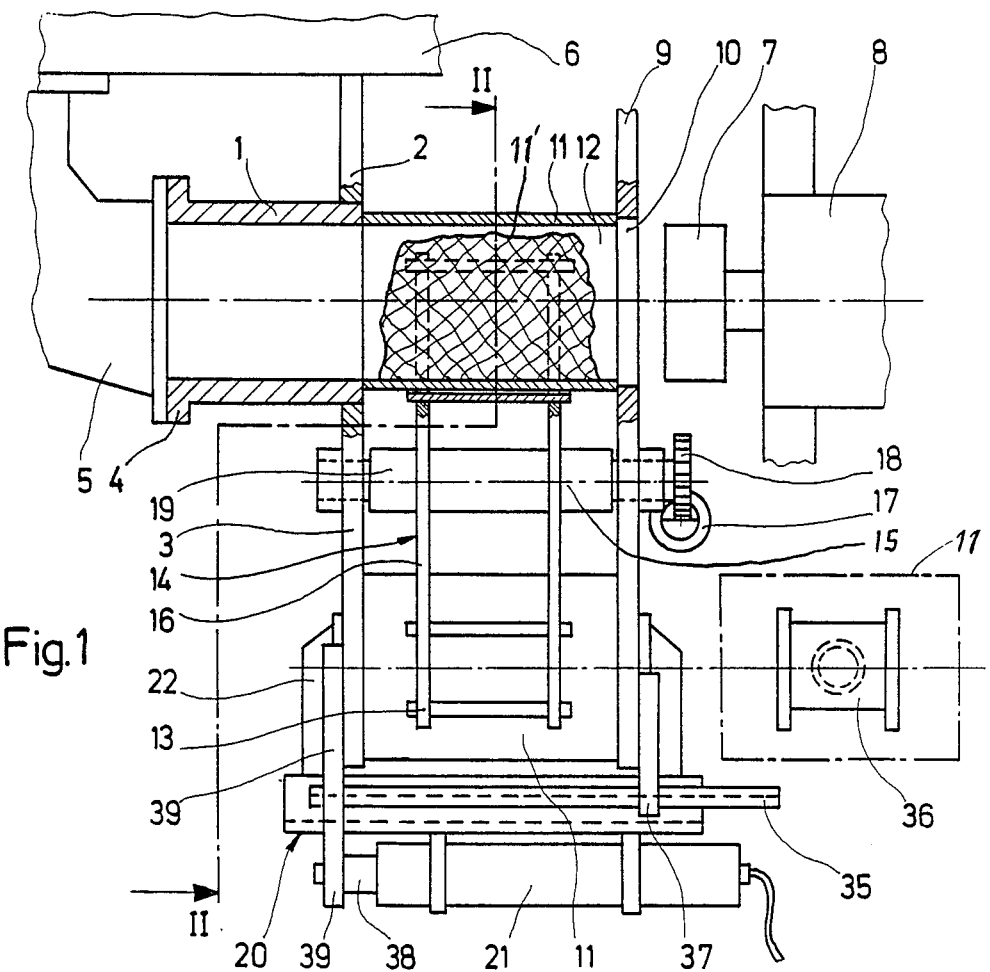
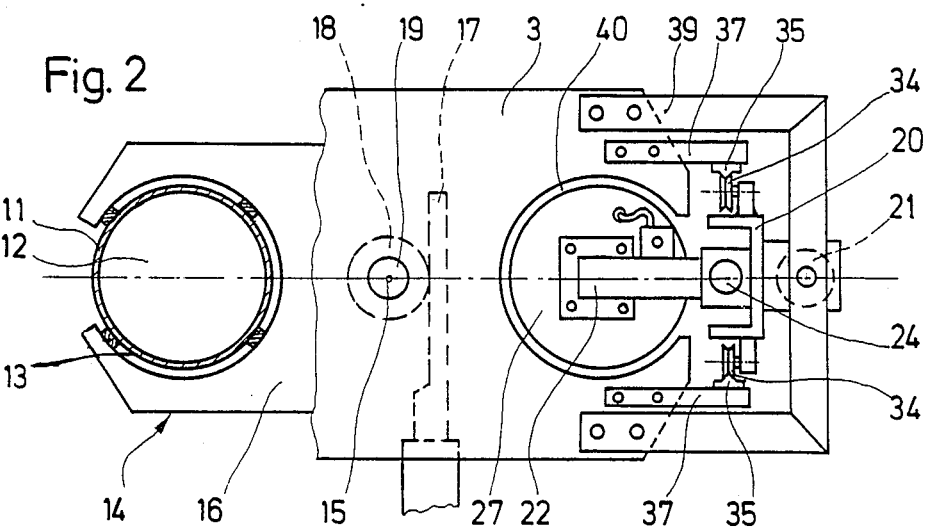

PROCESS FOR FEEDING AN INJECTION MOLDING MACHINE AND DEVICE FOR CARRYING OUT THE PROCESS

The invention relates to a process for feeding an injection molding machine, especially for polyester processing, in which the plastic material to be processed is fed into material containers of a feed device and discharged into a feed cylinder.

BACKGROUND OF THE INVENTION

A feed device of this type has already become known in which several full material containers are stacked above one another in a magazine. The hollow, cylindrical material containers are open on their front ends and reach a discharge station in a horizontal position with the aid of a lifting device. The discharge station consists of a horizontally slidable discharge piston which, to discharge the material container, enters the hollow, cylindrical interior of the material container from the front end and pushes out the polyester material. The discharge station is placed above the feed cylinder of the injection molding machine so that when the discharge piston pushes through the material container, the material falls into the vertical feed cylinder which is open on the top front side. By lowering the feed ram into the feed cylinder, the material is pressed into the plasticizing cylinder of the injection molding machine.

This known embodiment has the disadvantage that the full material containers are brought in an open state into the feed device. The material containers are of course delivered closed, the covers must nevertheless be removed before the material container is brought into the magazine of the feed device. The result is that the delicate polyester material is exposed, during a relatively long time until being poured into the feed cylinder, to harmful environmental influences, especially air and heat, by which the material properties change. The longer the carrying distance and the dwell time of the open, full material container, the greater is the risk of contamination of the material, especially when light colors are involved. Furthermore, material which remains longer in the machine area requires different machine adjustment parameters than material which stays for a short time, so that a constant change in the control values by the operators is required. This also increases the unpleasant annoyance of odor. The danger exists of material falling out of the open containers and being contaminated. This disadvantage is already noticeable during removal of the covers before bringing the material containers into the magazine of the feed device. The result of this is an increased cleaning expense, which goes even higher the greater the number of machine parts which come or could come into contact with the material.

The object of the invention is thus to keep the time between opening the full material containers and discharging them into the feed cylinder as short as possible and, overall, to simplify and accelerate the feed process.

SUMMARY OF THE INVENTION

The object is obtained according to the invention in that the material containers are closed airtight after the material is poured in, brought into the feed device in this state and are automatically opened immediately before being discharged into the feed cylinder.

To make the work sequence more efficient, the material containers are again automatically closed inside the feed device after being discharged. Thus the closing part or parts which were removed from the full material container are used to seal the preceding material container after it is discharged.

According to another feature of the invention the feed cylinder is given a cover-removing device to automatically open and/or close the material containers.

Advantageously, the cylindrical interior of the material containers is closed airtight by a removable cover placed on each front end.

To transfer and position the open material containers from the cover-removing device to the feed cylinder, the feed cylinder is given a transfer device by which the material containers can be brought from an intake position into a discharge position and vice versa and the cover-removing device is allocated to the intake position.

Advantageously, the transfer device consists of a swivel frame with a mounting device for the material container, which can be pivoted from the intake position into the discharge position and vice versa in an axis parallel to the longitudinal axis of the feed cylinder.

To be able to bring each of two material containers simultaneously from the intake position into the discharge position and vice versa, the swivel frame is built with two arms and each arm exhibits a mounting device for the material container and the swivel frame can be pivoted 180° C., from the intake position into the discharge position and vice versa.

In another embodiment of the invention the swivel frame exhibits more than two mounting devices placed equidistant on the perimeter for receiving the material containers.

For the automatic feed of the material containers and their removal the swivel frame or the mounting device for the material container in the intake position are allocated a transfer carriage, by which the material container can be inserted into the mounting device and extracted from the mounting device. In doing so the direction of movement of the transfer carriage is parallel to the direction of movement of the feed ram.

To grasp and hold the material container during the insertion and extraction movement of the transfer carriage, two holders which can move parallel to the direction of movement of the transfer carriage are placed in the transfer carriage, are connected to each other by a double action piston-cylinder unit and grasp the material container on the front ends. Advantageously, the cover-removing device for automatically removing and/or installing the covers is formed by both holders of the transfer carriage and each holder exhibits a suction device, by which the suction device of the cover of the material container is pressed against the inner side of the holder when the current of suction air is turned on. The cover is thus removed by the separation of the holders or of the piston-cylinder unit in the intake position and is installed by the coming together of both holders or of the piston-cylinder unit.

An especially advantageous embodiment of the invention is characterized in that on the free end of the holders a cylindrical holding disk is placed which engages in a corresponding recess on the outside of the cover and in that the suction device is placed on the holding disk.

To prevent the material from coming out between the front ends of the open material container and the inner surfaces of the side walls, the length of the material container without cover is equal to the distance between the side walls. Thus the front ends of the plastic material container are against the inner surfaces of the side walls and seal the interior of the material container outwardly during transfer from the intake position into the discharge position.

So that the material cannot come out between the front ends of the material container and the inner surfaces of the covers when the covers are removed, the extraction elevation of the holders or the holding disks during removal of the covers is equal to the depth the cover sinks into the interior of the material container. Thus the inner surfaces of the removed covers, which in this position cover the opening in the side walls, are in the same plane as the inner surfaces of the side walls so that the front ends of the material container glide tightly along the inner surfaces of the covers during transfer from the intake position to the transfer position.

According to another feature of the invention, in the discharge position the material container assumes a coaxial position between the feed cylinder and the feed ram in which it forms a part of the feed cylinder and the feed ram passes through it to discharge it.

The advantages obtained with the invention consist especially of the fact that as a result of the short time during which the material containers are open until they are discharged, i.e., without covers, the impairment of the material by environmental influences on the one hand, and the impairment of the environment by the material itself due to odor and contamination, on the other hand, is only extremely limited. Since the material containers reach the feed device in a closed state, the material supply to the machine can be extended and enlarged, which results in simplified automation of the feed process. With larger amounts the material can be packed directly by the material manufacturer into the material containers. This eliminates the additional disposable packaging, in which the material is discharged into plastic bags and stored in cartons or tin buckets. The possibility of automatically reclosing the material containers immediately after discharging, with which a simultaneous cleaning with the feed ram is also connected, allows the material containers to be used repeatedly.

BRIEF DESCRIPTION OF DRAWINGS

The invention is further explained in the following description and drawing, which represents an embodiment there shown in:

FIG. 1, a top view of the feed device of the injection molding machine, partially in section;

FIG. 2, a section through the feed device along line II—II in FIG. 1;

DETAILED DESCRIPTION

Figure 3:
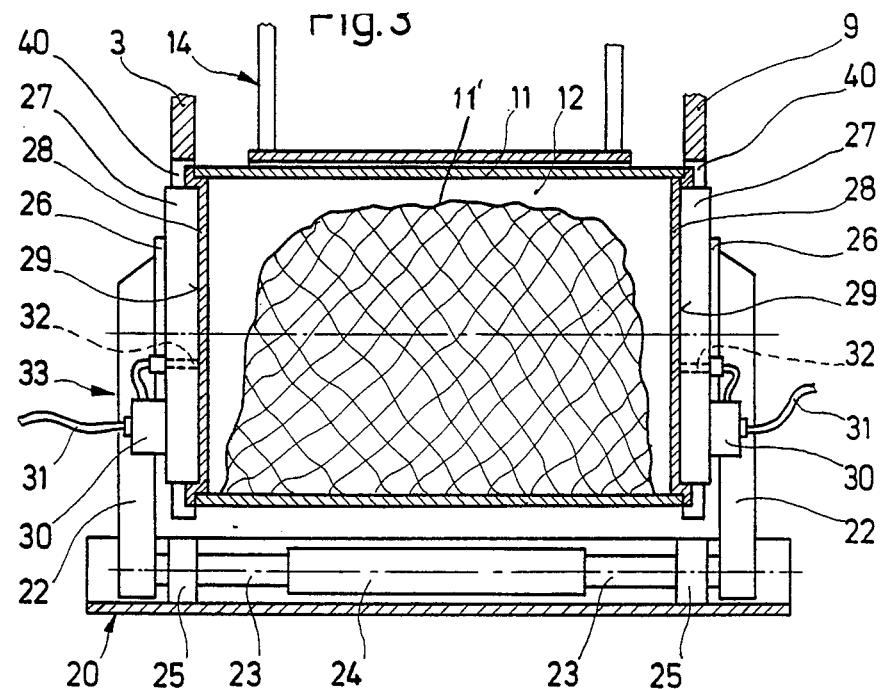
FIG. 3, a top view of the cap removing device of the feed device according to FIG. 1 with closed material container and FIG. 4, the cap removing device according to FIG. 3 with opened material container.

A feed cylinder 1 of an injection molding machine, not further described, is solidly connected to machine frame 2 by a side plate 3. On discharge flange 4 of feed cylinder 1, a guide chute 5 is attached, by which polyester material 11' to be processed is fed into plasticizing unit 6 of the injection molding machine. A feed ram 7 is guided in feed cylinder 1 and in its starting position according to FIG. 1 is situated outside feed cylinder 1. Feed ram 7 is driven by a hydraulic piston-cylinder unit 8. Parallel to side plate 3 a second side plate 9 is placed, which likewise is solidly connected to machine frame 2 and exhibits a through-hole 10 for feed ram 7. The distance between both side plates 3 and 9 corresponds to the length of a cylindrical material container 11 which is situated in its discharge position, as shown in FIG. 1, coaxial to feed cylinder 1 and feed ram 7 between side plates 3 and 9. Material container 11 exhibitis a cylindrical interior 12 whose diameter corresponds to the inside diameter of feed cylinder 1.

Material container 11 is kept in the discharge position by a mounting device 13 of a swivel frame 14. Swivel frame 14 is designed with two arms and is supported on side plates 3 and 9 so that it can be pivoted around an axis 15 parallel to the longitudinal axis of feed cylinder 1. Each one of arms 16 of swivel frame 14, offset at 180° to one another, on its end supports mounting device 13, which loosely envelops material container 11 in an angle sector of about 300°. Driving of swivel frame 14 occurs by a rack 17, which engages in a gear wheel 18 of shaft 19 of swivel frame 14. The pivoting area of swivel frame 14 is 180° each time from an intake position to the dischrge position and vice versa.

In the intake position, swivel frame 14 is allocated a conveyor carriage 20, which can be moved parallel to axis 15 of swivel frame 14 with the aid of a piston-cylinder unit 21. Two holders 22 are movably supported on conveyor carriage 20 parallel to the direction of movement of conveyor carriage 20 (FIG. 3). Each holder 22 is connected to the end of a piston rod 23 of a double-action piston-cylinder unit 24, which is attached to conveyor carriage 20. Piston rods 23 are supported on bearings 25 of conveyor carriage 20 so they are axially movable and cannot be rotated. The free end of each holder 22 is solidly connected to a circular holding disk 27 by a plate 26. Material holder 11 is taken up between the two holding disks 27 and is closed airtight on each front end by a round cover 28. Each cover 28 exhibits on its outside a cylindrical recess 29, in which holding disks 27 engage. Holding disks 27 are equipped with a suction device 30, which is mounted on the outside of holding disks 27. The suction air current is fed by a pipe 31 to the suction device 30 and acts through a channel 32 in holding disk 27 on cover 28, which is thus pressed against the inside of holding disks 27. Holders 22 with holding disks 27 and piston-cylinder unit 24 form an automatic cap-removing device 33, with which covers 28 are removed by the separation of holders 22 from material container 11 and are installed by the coming together of holders 22 in the front ends of material container 11.

Conveyor carriage 20 exhibits, on its top and bottom sides, rollers 34, which are guided on rails 35 (FIGS. 1 and 2). Rails 35 run parallel to axis 15 of swivel frame 14 and extend beyond side plate 9 to a lifting device 36 for material containers 11. Rails 35 are attached by brackets 37 to side plates 3 and 9. Double-action piston-cylinder unit 21, with which conveyor carriage 20 can be driven over lifting device 36, is screwed on the rear side of conveyor carriage 20. The free end of piston rod 38 is attached to a square frame 39, which is screwed onto side plate 3, and is braced against it. Side walls 3 and 9 exhibit openings 40 for holding disks 27 and holders 22 to pass through during movement of conveyor carriage 20.

Figure 4:
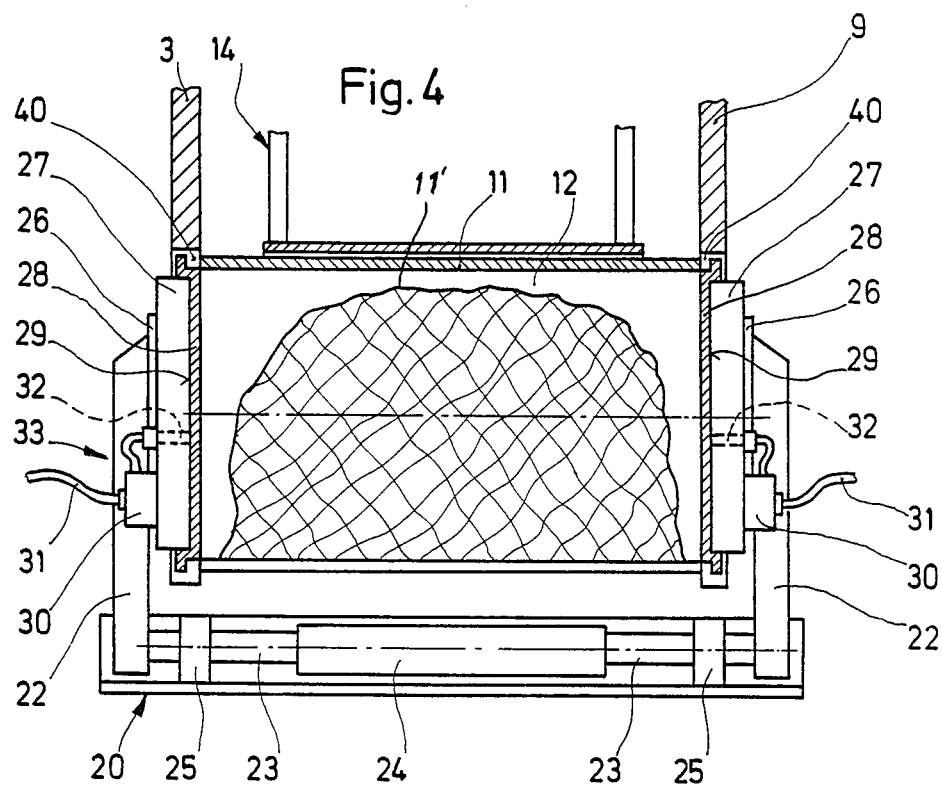

The operation of the invention is as follows:

With the aid of lifting device 36, a material container 11, which is full and closed airtight by covers 28, is lifted between the separated holding disks 27 of conveyor carriage 20, which is located above lifting device 36. By operation of piston-cylinder unit 24, holding disks 27 engage in recesses 29 of covers 28 and hold the material container 11 firmly. Then, conveyor carriage 20 with material container 11 is inserted into mounting device 13 of swivel frame 14 by operation of piston-cylinder unit 21 and placed in the intake position (FIG. 3). Suction device 30 is turned on so that covers 28 are pressed against the inside of holding disks 27 by the current of suction air. By operation of piston-cylinder unit 24 holders 22 with holding disks 27 are separated and covers 28 are removed from material container 11. In this situation the length of the retraction elevation is equal to the depth by which cover 28 is inserted into interior 12 of material container 11. Covers 28 atop holding disks 27 are thus brought into a position as in FIG. 4 in which their inner surfaces are in the same vertical plane as the inner surface of side walls 3 and 9. Cover 28 thus forms, together with side wall 3 or 9, a closed inner surface along which the front ends of open material container 11 glide during its conveyance from the intake position to the discharge position.

By turning on rack-and-pinion drive 17, 18, swivel frame 14 is pivoted 180° along with full, uncovered material container 11 around axis 15 into the discharge position (FIG. 1). In this position material container 11 is in a coaxial position with feed cylinder 1 and feed ram 7. By operation of piston-cylinder unit 8, feed ram 7 passes through opening 10 of side plate 9 into interior 12 of material container 11 and pushes the material into adjacent feed cylinder 1. Feed ram 7 passes through material container 11 and plunges into feed cylinder 1 to press the material into plasticizing cylinder 6. At the end of the filling process feed ram 7 goes back to its starting position according to FIG. 1 and swivel frame 14 with empty material container 11 is pivoted back 180° to the intake position.

Simultaneously with the pivoting of full material container 11 into the discharge position, the preceding, emptied material container 11 from second arm 16 of swivel frame 14 is pivoted into the intake position. On holding disks 27 are covers 28 of full material container 11, now in the discharge position, and the covers are used for closing empty material container 11. For this purpose, piston-cylinder unit 24 is operated and, by the coming together of holders 22, covers 28 are pressed into the open front sides of empty material container 11. By operation of piston-cylinder unit 21, conveyor carriage 20 is retracted from mounting device 13 of swivel frame 14 together with empty, closed material container 11 and positioned above lifting device 36. Holders 22 with holding disks 27 are separated by operation of piston-cylinder unit 24 and material container 11 is released. By an ejector, not shown, of lifting device 36, empty material container 11 is ejected and a new, full and closed material container 11 is fed to lifting device 36 from a conveyor belt. The further working sequence, i.e., positioning of material container 11 with the aid of lifting device 36 between holding disks 27, transfer into the intake position, uncovering and pivoting into the discharge position, occurs as already described.

What is claimed is:

1. In a process for feeding an injection molding machine including polyester processing with a plastic material to be processed, the steps of placing a plastic material to be processed into a container having two opposed open ends, closing air-tight the open ends of the container with removable covers, providing a frame pivotable between intake and discharge positions around an axis supported between a pair of spaced parallel surfaces and having means thereon for carrying said containers, placing the closed container on carrying means in an intake position and retracting the covers from the container ends while the container is in the intake position, pivoting the frame to displace the open ended container of plastic material between the two spaced parallel surfaces from the intake position into a discharge position at the feed cylinder of the machine, said parallel surfaces being spaced the length of the container, and pushing the plastic material from the container into the feed cylinder while the container is in the discharge position.

2. In a process as claimed in claim 1 and maintaining the open ends of the container against the spaced parallel surfaces respectively during displacing of the container from the intake to the discharge positions.

3. In a process as claimed in claim 2 and displacing about said axis the opened container after pushing of the plastic material therefrom from the discharge position to the intake position.

4. In a process as claimed in claim 3 and pressing the retracted cover into the open ends of the container to close the container after the plastic material has been pushed into the feed cylinder and the container has been transferred to the intake position.

5. In a process as claimed in claim 1 and retaining the retracted covers in retracted positions from the opened cylinder and pressing the same covers into the open ends of a preceding cylinder to close the preceding cylinder after said preceding cylinder has been discharged of plastic material to be processed and displaced from the discharge position back to the intake position.

6. In a process as claimed in claim 1 wherein the container comprises a hollow cylinder having both ends thereof open, closing both ends by seating a cover into each of the open ends after a plastic material to be processed is placed into the container.

7. In a process as claimed in claim 1 wherein the container located in the discharge position is coaxial with the feed cylinder and an axially displacable feed ram which is also a coaxial extension of the feed cylinder.

8. In a process as claimed in claim 7 and axially displacing the feed ram through the opened container to push plastic material therefrom into the feed cylinder.

9. In a process as claimed in claim 6 and maintaining both open ends of the hollow cylinder container against the respective spaced parallel surfaces during displacing of the hollow cylinder between intake and discharge positions.

10. In a process as claimed in claim 9, and retracting the covers from the ends of the hollow cylinder to such a distance that the inner surfaces of the retracted covers are coplanar with the spaced surfaces and retaining the retracted covers at such distance during displacing of the hollow cylinder between intake and discharge positions such that closed surfaces are defined by the retracted covers and respective spaced surfaces.

11. In a process as claimed in claim 10 wherein the distance of retraction of each cover is equal to the depth the cover is seated within an open end of the hollow cylinder in the closed position.

* * * * *